United States Patent [19]

Snavely

[11] 4,104,334

[45] Aug. 1, 1978

[54] RUBBER COMPOSITION

[75] Inventor: Kenneth E. Snavely, Bartlesville, Okla.

[73] Assignee: Phillips Petroleum Company, Bartlesville, Okla.

[21] Appl. No.: 621,099

[22] Filed: Oct. 9, 1975

[51] Int. Cl.$^2$ .................... C08L 9/06; C08L 23/22
[52] U.S. Cl. .................... 260/888; 260/42.36
[58] Field of Search .................... 260/888

[56] References Cited

U.S. PATENT DOCUMENTS 3,798,190   3/1974   Yoshimoto et al. .................. 260/888

*Primary Examiner*—J. Ziegler

[57] ABSTRACT

A halogen free rubber composition consisting essentially of 70–90 parts per weight of at least one butyl rubber, 30–10 parts per weight of at least one random copolymer of a monovinylaromatic monomer of 8–12 carbon atoms and a conjugated diene monomer of 4–8 carbon atoms and a vulcanizing agent exhibits high hardness and low resilience.

6 Claims, No Drawings

RUBBER COMPOSITION

The present invention relates to a rubber composition. More particularly the present invention relates to vulcanizable rubber compositions.

BACKGROUND OF THE INVENTION

Butyl rubber is a copolymer of mainly an isomonoolefin with a small quantity of an acyclic conjugated diene monomer. The vulcanized butyl rubber possesses relatively good resistance to degradation by heat, oxygen and ozone, and also exhibits remarkably low permeability to gases. Butyl rubber is, however, for various applications, not hard enough. Therefore, the problem exists to increase the hardness of the butyl rubber. Furthermore, it would be desirable for special applications to increase the hardness of the butyl rubber and to reduce its resilience.

THE INVENTION

It is, therefore, one object of this invention to provide a new rubber composition that exhibits high hardness after vulcanizing.

Still a further object of this invention is to provide a rubber composition that has low resilience after vulcanization.

These and other objects, advantages, features and embodiments of this invention will become apparent to those skilled in the art from the following detailed description of the invention and the appended claims.

In accordance with this invention, I have now found that a halogen free rubber composition consisting essentially of 70 to 90 parts by weight of at least one butyl rubber, 30 to 10 parts per weight of at least one random copolymer of a monovinylaromatic monomer of 8 to 12 carbon atoms and an acyclic conjugated diene monomer of 4 to 8 carbon atoms and a vulcanizing agent after vulcanization exhibits increased hardness, as compared to the butyl rubber, and low resilience.

The vulcanized rubber composition can be used in dock fenders, engine mounts, shoe soles, bowling alley back top pads, load cushions for trains and trucks and the like.

The main component of the rubber mixture of this invention is a butyl rubber or a mixture of butyl rubbers. The term "butyl rubber", as used herein, is definitive of a copolymer of a major portion of an isoolefin and a small amount of an acyclic conjugated diene monomer. The preferred group of butyl rubbers consists of the copolymers of isobutylene with linear conjugated dienes, wherein the diene portion is about 1-3 mole percent of the monomer mixture. The preferred acyclic, conjugated dienes contain from 4 to about 12 carbon atoms per molecule, those containing 4 to about 8 carbon atoms per molecule being preferred. Examples for acyclic conjugated linear dienes useful as the small amount of additional monomers include such as 1,3-butadiene, isoprene, 2,3-dimethyl-1,3-butadiene, piperylene, 3-butyl-1,3-octadiene, 2-phenyl-1,3-butadiene. Isoprene is presently preferred. Mixtures of different butyl rubbers can be used in accordance with this invention.

The term random copolymer, as used herein, defines a copolymer of at least two monomers. The first monomer is a monovinylaromatic monomer. Examples for this monomer are styrene, 3-methylstyrene, 4-n-propylstyrene, 4-cyclohexylstyrene, 4-dedecylstyrene, 2-ethyl-4-benzylstyrene, 4-p-tolylstyrene, 4-(4-phenyl-n-butyl)styrene. Monovinylaromatic monomers with 8 to 12 carbon atoms are presently preferred. Styrene is the presently preferred monovinylaromatic monomer. The second monomer of the random copolymer is a conjugated diene having 4 to about 12 carbon atoms. The preferred monomer is a linear conjugated diene containing 4-12, preferably 4-8 carbon atoms per molecule. Examples for this second monomer are 1,3-butadiene, isoprene, 3-butyl-1,3-octadiene, 2-phenyl-1,3-butadiene. Further, mixtures of monovinylaromatic monomers and/or mixtures of acyclic conjugated dienes can be used.

The rubber composition of this invention further contains one or more vulcanizing agents. Such vulcanizing agents are well known in the art. Examples for such vulcanizing agents are sulfur, tetramethylthiuram disulfide, dimorpholinyl disulfide, and dibutylxanthogen disulfide. Depending upon the kind of vulcanizing agent used, the quantity of the vulcanizing agent will vary. Generally, however, the quantity of the vulcanizing agent will be in the range of 0.1 to about 8 parts by weight per hundred parts of the entire rubber (phr) composition of butyl rubber and the random copolymer.

In addition to the three main components mentioned above, the composition of this invention can contain other agents of the type that are usually employed in the compounding of butyl rubber. Examples of additional compounding agents would be accelerating agents, zinc oxide, stearic acid, carbon black, clay, antioxidants and pigments.

The composition of this invention is produced by thoroughly admixing the ingredients. Neither the sequence of addition nor the special mixing procedure is critical. Generally the ingredients are mixed on a roll mill or in an internal mixer, e.g. a Banbury mixer.

The resulting composition is then formed into the desired shape by any of the usually employed methods for shaping rubber compositions. Thus the composition of this invention can be extruded into tubes or threads on a wire, the composition can be calendered or applied to fabric by a dipping procedure. The compounded synthetic rubber mixture can thereafter be vulcanized. The usually employed temperature for the vulcanization process is in the range of about 240° F to about 380° F, and the vulcanizing operation is carried for about 4 to about 120 minutes. The vulcanized articles exhibit high hardness and low resilience, good elongation, a good abrasion resistance, and a particularly good resistance to the action of heat, as well as good tensile strength.

The invention will be still more fully understood from the following examples that illustrate preferred embodiments of this invention without limiting the scope thereof.

EXAMPLE I

The ingredients shown in the following recipe were thoroughly mixed in a Banbury mixer. The rubber composition was formed into a slab, which was vulcanized at 320° F for 20 or respectively 30 minutes. Test specimens were cut from these slabs. The specimens then were tested in accordance with the test methods indicated below. The results are shown in the following tables.

| Recipe | |
|---|---|
| | phr (parts by weight per one hundred parts per weight of total rubber) |
| Butyl rubber[a] | variable |
| Solution SBR-A[b] | variable |
| Solution SBR-B[c] | variable |
| Emulsion SBR[d] | variable |
| Zinc oxide | 5 |
| Stearic acid | variable |
| Flexon 840[e] | variable |
| Circosol 4240[f] | variable |
| Carbon black type N550 | 30 |
| Carbon black type N774 | 30 |
| Sulfur | 2 |
| MBT[g] | 0.5 |
| Methyl tuads[h] | 1 |
| Ethyl tellurac[i] | 0.5 |

[a]An isobutylene/isoprene copolymer of Mooney viscosity ML-8 at 212° F of 71 minimum ("Enjay Butyl 218", see Rubber Technology, Second Edition, M. Morton, Van Nostrand Reinhold, 1973, p. 255.)
[b]A solution polymerized 52/48 butadiene/styrene copolymer initiated by n-butyllithium randomized by tetrahydrofuran, terminated by a fatty acid and containing approximately 10% polystyrene (Solprene® 303).
[c]A solution polymerized 75/25 butadiene/styrene copolymer initiated by n-butyllithium, randomized by tetrahydrofuran, terminated by stannic chloride, and containing no detected polystyrene (Solprene® 1204).
[d]An emulsion copolymer containing 76.5 wt. % butadiene and 23.5 wt. % styrene, of 52 ML-4 at 212° F, and made employing a mixed fatty acid - rosin acid emulsifier system (SBR 1502).
[e]A paraffinic oil, Data Sheet DG-2P2, Humble Oil and Refining Co., August 5, 1964.
[f]A naphthenic oil containing 47.5% aromatics, viscosity (100° F) of 2525 SUS, flash point 430° F and aniline point of 172° F.
[g]2-Mercaptobenzothiazole
[h]Tetramethylthiuram disulfide
[i]Tellurium diethyldithiocarbamate

| Composition and Evaluation of Cured Blends | | | | | | | |
|---|---|---|---|---|---|---|---|
| Components, phr | A | B | C | D | E | F | G |
| Butyl rubber | 100 | 90 | 80 | 70 | 80 | 70 | 80 |
| Solution SBR-A | | 10 | 20 | 30 | | | |
| Solution SBR-B | | | | | 20 | 30 | |
| Emulsion SBR | | | | | | | 20 |
| Stearic acid | | 0.5 | 1 | 0.5 | 1 | 1.5 | 1 |
| Flexon 840 | 25 | 22.5 | 20 | 17.5 | 20 | 17.5 | 20 |
| Circosol 4240 | | 2.5 | 8 | 12.5 | 5 | 7.5 | 5 |
| Evaluations | Min. Vulcanized | | | | | | |
| Tensile | 20 | 1620 | 1010 | 320 | 380 | 270 | 510 | 250 |
| psi (a) | 30 | 1460 | 920 | 290 | 370 | 300 | 510 | 250 |
| Elongation | 20 | 600 | 700 | 590 | 160 | 470 | 170 | 420 |
| % (a) | 30 | 530 | 680 | 590 | 150 | 380 | 140 | 390 |
| 300% Modulus | 20 | 620 | 380 | 280 | (d) | 260 | — | 220 |
| psi (a) | 30 | 690 | 380 | 250 | — | 260 | — | 210 |
| Shore A | 20 | 50 | 68 | 75 | 75 | 68 | 72 | 67 |
| Hardness (b) | 30 | 52 | 68 | 77 | 76 | 69 | 72 | 67 |
| Resilience | 20 | 68.0 | 43.5 | 30.0 | 34.6 | 52.5 | 57.8 | 53.6 |
| (c) | 30 | 68.9 | 45.5 | 29.1 | 35.2 | 51.8 | 57.6 | 54.7 |

(a) ASTM D 412-66
(b) ASTM D 2240-68
(c) ASTM D 945-59 Yerzley oscillograph. Test is modified in that specimen is a right circular cylinder 0.7-inch in diameter and 1-inch high.
(d) A dash denotes no determination was possible.

Surprisingly, it has been found that compositions of butyl rubber with random copolymers exhibit an increased hardness of the blend. Furthermore, the composition has advantageously low resilience. The increased hardness is seen from a comparison of columns E and F with column A for blends including solution polymerized butadiene/styrene copolymers and column G shows the result as compared to column A for a blend including an emulsion polymerized butadiene/styrene copolymer.

EXAMPLE II

The components of the following recipe were thoroughly mixed in a Banbury mixer. The obtained rubber composition was formed into slabs which were thereafter vulcanized at 320° F for 20 or respectively 30 minutes as indicated. Test specimens were cut. The vulcanized test specimens were then evaluated in accordance with method defined in Example I. The results of the evaluations are also shown in the following table.

| Recipe | |
|---|---|
| | phr |
| Butyl rubber - A[a] | variable |
| Solution SBR[b] | variable |
| Pliolite S6B[c] | variable |
| Butyl rubber - B[d] | variable |
| Polymer(s) (selected from the above as indicated below) | |
| Stearic acid | 1 |
| Carbon black type N550 | 30 |
| Carbon black type N774 | 30 |
| Sunpar 2280[e] | 25 |
| Zinc oxide | 5 |
| Sulfur | 2 |
| MBT | 0.5 |
| Methyl Tuads | 1 |
| Ethyl Tellurac | 0.5 |

[a]An isobutylene/isoprene copolymer of Mooney viscosity ML-8 at 212° F of 61-70. ("Enjay Butyl 217", see Rubber Technology, Second Edition, M. Morton, Van Nostrand Reinhold, New York (1973) p. 255).
[b]Solprene 1204, see footnote c, Example I.
[c]A high styrene resin, 82.5% styrene/17.5% butadiene.
[d]A chlorinated isobutylene/isoprene copolymer of Mooney viscosity ML (1 + 3 min.) at 260° F of 50-60; chlorine, 1.1–1.3 wt. %. ("Enjay Butyl HT 10-68, see Vanderbilt Rubber Handbook, G. G. Winspear, R. T. Vanderbilt Co., Inc. (1968) p. 64, and Rubber Technology, Second Edition, M. Morton, Van Nostrand Reinhold, New York (1973) p. 263).
[e]A paraffinic extender oil having a viscosity of 2907 SUS at 100° F.

| Composition and Evaluation of Cured Blends | | | | | | | | | |
|---|---|---|---|---|---|---|---|---|---|
| Components, phr | H | I | J | K | L | M | N | O | P | Q |
| Butyl rubber-A | 100 | | 90 | 80 | 70 | 90 | 80 | 70 | 70 | 70 |
| Solution SBR | | 100 | 10 | 20 | 30 | | | | 20 | |
| Pliolite S6B | | | | | | 10 | 20 | 30 | | 20 |
| Butyl rubber-B | | | | | | | | | 10 | 10 |

-continued
Composition and Evaluation of Cured Blends

| Evaluations[c] | Min. Vulcan- ized | | | | | | | | | | |
|---|---|---|---|---|---|---|---|---|---|---|---|
| Tensile, psi | 20 | 1820 | 1310 | 625 | (a) | 510 | 1445 | 780 | 480 | 355 | 1010 |
|  | 30 | 1740 | 1300 | 645 | (a) | 515 | 1360 | 845 | 440 | 355 | 990 |
| Elongation, % | 20 | 700 | 150 | 720 | 400 | 150 | 670 | 580 | 480 | 430 | 500 |
|  | 30 | 640 | 140 | 740 | 410 | 140 | 630 | 590 | 450 | 450 | 490 |
| 300 % | 20 | 550 | (b) | 280 | 220 | — | 630 | 485 | 380 | — | 700 |
| Modulus, psi | 30 | 650 | — | 350 | 250 | — | 675 | 490 | 350 | — | 700 |
| Shore A | 20 | 47.5 | 61 | 61 | 69 | 72 | 59 | 70 | 83 | 67 | 71.5 |
| Hardness | 30 | 48 | 61 | 65.5 | 70 | 72 | 61 | 74 | 85 | 68 | 75 |
| Shore D | 20 | 13 | 21 | 18 | 21 | 23 | 17 | 23 | 33 | 20 | 25 |
| Hardness | 30 | 13 | 21 | 18 | 22 | 23 | 18 | 25 | 34 | 21 | 25 |

(a) At break.
(b) A dash denotes no determination was possible.
(c) Resilience was not determined.

The data of the tables show that the rubber composition in accordance with the invention shows an increased hardness even without the presence of halogen-donating compounds. Columns P and L rather indicate that the incorporation of halogens into the butyl rubber is detrimental to the hardness quality.

Reasonable variations and modifications that will become apparent to those skilled in the art can be made in this invention without departing from the spirit and scope thereof.

I claim:

1. A halogen-free vulcanizable rubber composition consisting essentially of
   from 70 to 90 parts per hundred parts rubber of at least one butyl rubber, and
   from 30 to 10 parts per hundred parts rubber of at least one solution formed random copolymer of at least one vinylaromatic monomer of 8 to 12 carbon atoms and a conjugated acyclic diene monomer of 4 to 8 carbon atoms, said random copolymer having been produced by polymerizing said vinylaromatic monomer and said acyclic diene monomer in solution in the presence of a randomizing agent, wherein the total quantity of the butyl rubber and the solution formed random copolymer is 100 parts per hundred parts rubber, and
   from 0.1 to 8 parts per hundred parts rubber of a vulcanizing agent selected from the group consisting of sulfur, tetramethylthiuram disulfide, dimorpholinyl disulfide, and dibutylxanthogen disulfide, and mixtures thereof.

2. The composition of claim 1 wherein said vinylaromatic monomer is styrene and said conjugated acyclic diene monomer is butadiene.

3. A composition according to claim 2 wherein said butyl rubber is a copolymer of about 97 to 99 mole percent of isobutylene and about 3 to 1 mole percent of a conjugated diene having 4 to 12 carbon atoms.

4. A composition according to claim 1 wherein said random copolymer is a solution polymerized copolymer consisting of 52 weight percent butadiene and 48 weight percent styrene, and said randomizing agent is tetrahydrofuran.

5. A composition according to claim 4 wherein said copolymer was solution-polymerized using a n-butyllithium initiator, the polymerization was terminated by a fatty acid and the copolymer contains about 10 percent polystyrene.

6. A vulcanized composition in accordance with claim 8.

* * * * *